Patented Nov. 28, 1933

1,936,587

UNITED STATES PATENT OFFICE 1,936,587

TREATMENT OF CELLULOSIC MATERIALS AND TO THE PRODUCTION OF CELLULOSE ESTERS AND CELLULOSE ESTER PRODUCTS THEREFROM

Henry Dreyfus, London, England

No Drawing. Application March 21, 1929, Serial No. 348,981, and in Great Britain June 7, 1928

14 Claims. (Cl. 260—101)

This invention relates to the treatment of cellulosic materials, more particularly for the purpose of rendering them more reactive towards esterification and especially acetylation and also to the production of cellulose acetates or other cellulose esters from the materials so treated.

In my prior U. S. applications S. Nos. 301,927 of 24th August 1928, 321,750 of 24th November 1928 and 321,751 of 24th November 1928, I have described processes for acetylating or otherwise esterifying cellulosic materials using as catalysts ferric chloride, stannic chloride or the chlorides of manganese, copper, nickel and cobalt or the corresponding bromides or iodides, these catalysts being used in most cases in conjunction with hydrochloric, hydrobromic or hydriodic acid.

In my prior U. S. application S. No. 328,306 of 24th December 1928 of which the present application is a continuation in part, I have described how cellulosic materials may be rendered more reactive towards esterification by treatment with hydrochloric, hydrobromic or hydriodic acid or with mixtures of such hydrohalide acids with organic acids, more especially lower aliphatic acids, such as formic or acetic acid. I have further stated that the said processes of pretreatment offer the greatest advantages when the subsequent acetylation or esterification is carried out according to the processes described in my said prior U. S. applications S. Nos 301,927 of 24th August 1928, 321,750 of 24th November 1928 and 321,751 of 24th November 1928, and that the hydrochloric, hydrobromic or hydriodic acid present in the cellulose after the pretreatment may either be utilized as part of the catalyst for the esterification according to the said processes or may be converted into halide catalysts.

I have now found that the halide salts themselves, namely ferric chloride, stannic chloride or the chlorides of manganese, copper, nickel and cobalt, or the corresponding bromides or iodides, are very effective in rendering the cellulose more easily acetylizable or esterifiable. Of these I have found ferric chloride and stannic chloride give the best results.

The halide pretreating agents of the present invention may be used in conjunction with the hydrohalide acid pretreating agents of my said prior U. S. application S. No. 328,306 of 24th December 1928 and/or in conjunction with organic acids, more especially in conjunction with lower aliphatic acids, for example formic or acetic acid. Such combined pretreatments with halide salts and hydrohalide acids and/or organic acids may be and are preferably carried out simultaneously, but the separate pretreating agents may, if desired, be used successively. In such a combined simultaneous pretreatment using organic acid, the halide with or without a hydrohalide acid may be dissolved in the organic acid, for example, formic or acetic acid. Preferably however, whether or not an organic acid is employed, the halide salt with or without hydrohalide acid is used in solution in a suitable liquid, for example water.

As initial materials for pretreatment according to the present invention and for subsequent conversion into cellulose esters, cotton (in either the mercerized or non-mercerized form) or other celluloses or near conversion products or other cellulosic materials may be employed. The cellulosic material used may contain the usual amounts of water, for example 4 to 6 or 8% or may be freed from moisture by drying. Wood pulps or other cellulosic materials containing encrusting matter and from which the lignin, pentosan, resin and like constituents have been substantially removed, for example sulphite pulp, soda pulp or sulphate pulp, may be employed, but in the case of such materials the pretreatment processes of the present invention are preferably combined with and follow an alkaline purifying treatment. In such a method of treatment the wood pulp or the like is first subjected to an alkaline purifying treatment in the manner described in U. S. application S. No. 747,054 of 31st October 1924, for example with caustic alkali of low concentration, such as 3% or under with heating or boiling, or with caustic alkali of higher concentration, such as 5 to 10% or more in the cold, or with only slight heating, and then subjected to the halide or halide and acid treatment of the present invention.

The pretreatment according to the present invention may, for example, be carried out by distributing a solution of the pretreating agents evenly over the cellulosic materials, for instance by spraying the solution in a drum or mixer, the cellulosic material being turned from time to time if necessary to ensure uniform impregnation. The cellulosic material is then allowed to stand until a product capable of rapid esterification is obtained.

The time required for the pretreatment varies with the nature of the cellulosic material, the concentration of the pretreating agent or agents, the temperatures at which the pretreatment is conducted and the degree of activity required. The treatment is preferably carried out at ordinary or only moderately increased temperatures, but may in some cases be accelerated by the use of somewhat higher temperatures.

The subsequent acetylation or esterification of the cellulosic material thus pretreated may be carried out by any suitable process. It is particularly advantageous however to conduct the esterification according to the processes described in my U. S. applications S. Nos. 301,927 of 24th August 1928, 321,750 of 24th November 1928 and 321,751 of 24th November 1928, and to use as catalyst the particular halide employed in the pretreatment. If a hydrohalide acid has not been employed in the pretreatment and is required as catalyst in the esterification, it may be added in solution, for example in water or acetic acid. If, on the other hand, a hydrohalide acid has been employed in the pretreatment and is not required in the esterification it may be neutralized, for example by addition of sodium or other acetate, or if required it may be converted into halide salts, for example by adding a substance, such as ferric oxide or ferric acetate which will react therewith.

Any acetic acid employed in the pretreatment may remain in the cellulosic material to act as solvent for the cellulose ester produced in subsequent esterification. Formic acid, however, except when used in comparatively small quantities (see prior U. S. Patent No. 1,697,907), should be removed or substantially removed before acetylation with acetic anhydride as it reacts therewith.

The acetylation or other esterification may, as described in my prior U. S. applications referred to above, be conducted in presence of a solvent for the cellulose ester produced or in presence of a non-solvent diluent or in absence of solvents or diluents (by employing a vaporous esterifying agent).

The following examples illustrate the processes of pretreatment according to the present invention and the preferred methods of subsequent esterification, but they are not to be considered as limiting the invention in any way:—

*Example 1*

100 parts of cotton cellulose are introduced in an acetylator into 600 parts of acetic acid containing 30 parts of fearic chloride and the whole allowed to stand for 4–6 hours with stirring. 600 parts of acetic anhydride are then added and the whole is constantly stirred and the temperature maintained at about that of the atmosphere until a clear solution is obtained.

*Example 2*

100 parts of cotton cellulose are sprayed with a mixture of 15–30 parts of concentrated hydrochloric acid, 10 parts of ferric chloride or stannic chloride and 40–60 parts of acetic acid. The mass is allowed to stand with occasional stirring for 3–6 hours. The cellulose thus pretreated is then introduced into an acetylator containing 600 parts of acetic anhydride and 550 parts of acetic acid. The acetylation, conducted at atmospheric temperature with constant mixing, proceeds smoothly and a clear solution is obtained.

The cellulose acetates or other cellulose esters obtained according to the present invention may be further treated for the purpose of changing their solubilities and may be utilized either as primary or secondary acetates or esters for the production of artificial silks, films, plastic masses, moulded articles, and for other purposes.

What I claim and desire to secure by Letters Patent is:—

1. Process for the treatment of cellulose, comprising treating the material with a halide of a metal having an atomic weight between 53 and 65, whereby it is rendered more reactive to subsequent esterification.

2. Process for the treatment of cellulose, comprising treating the material with a hydrohalide acid and a halide of a metal having an atomic weight between 53 and 65, whereby it is rendered more reactive to subsequent esterification.

3. Process for the treatment of cellulose, comprising treating the material with an organic acid and a halide of a metal having an atomic weight between 53 and 65, whereby it is rendered more reactive to subsequent esterification.

4. Process for the treatment of cellulosic material, comprising treating the material with ferric chloride, whereby it is rendered more reactive to subsequent esterification.

5. Process for the treatment of cellulosic material, comprising treating the material with hydrochloric acid and ferric chloride, whereby it is rendered more reactive to subsequent esterification.

6. Process for the treatment of cellulosic material, comprising treating the material with a lower aliphatic acid and ferric chloride, whereby it is rendered more reactive to subsequent esterification.

7. Process for the treatment of cellulosic material, comprising treating the material with hydrochloric acid, a lower aliphatic acid and ferric chloride, whereby it is rendered more reactive to subsequent esterification.

8. Process for the treatment of cellulosic material, comprising treating the material with ferric chloride, and thereafter esterifying by means of anhydrides in presence of the same catalysts.

9. Process for the treatment of cellulosic material, comprising treating the material with hydrochloric acid and ferric chloride, and thereafter esterifying by means of anhydrides in presence of the same catalysts.

10. Process for the treatment of cellulosic material, comprising treating the material with a lower aliphatic acid and ferric chloride, and thereafter esterifying by means of anhydrides in presence of the same catalysts.

11. Process for the treatment of cellulosic material, comprising treating the material with hydrochloric acid, a lower aliphatic acid and ferric chloride, and thereafter esterifying by means of anyhdrides in presence of the same catalysts.

12. Process for the treatment of cellulosic material, comprising treating the material with an acid and a halide of a metal having an atomic weight between 53 and 65, whereby it is rendered more reactive to esterification.

13. Process for the treatment of cellulosic material, comprising treating the material with an acid and ferric chloride, whereby it is rendered more reactive to esterification.

14. Process for the treatment of cellulosic material, comprising treating the material with an acid and ferric chloride, and thereafter esterifying by means of anhydrides in the presence of the same catalysts.

HENRY DREYFUS.